Jan. 10, 1950     G. J. EIDSON     2,493,952
AERATING DEVICE FOR LIVE BAIT CONTAINERS
Filed March 10, 1947
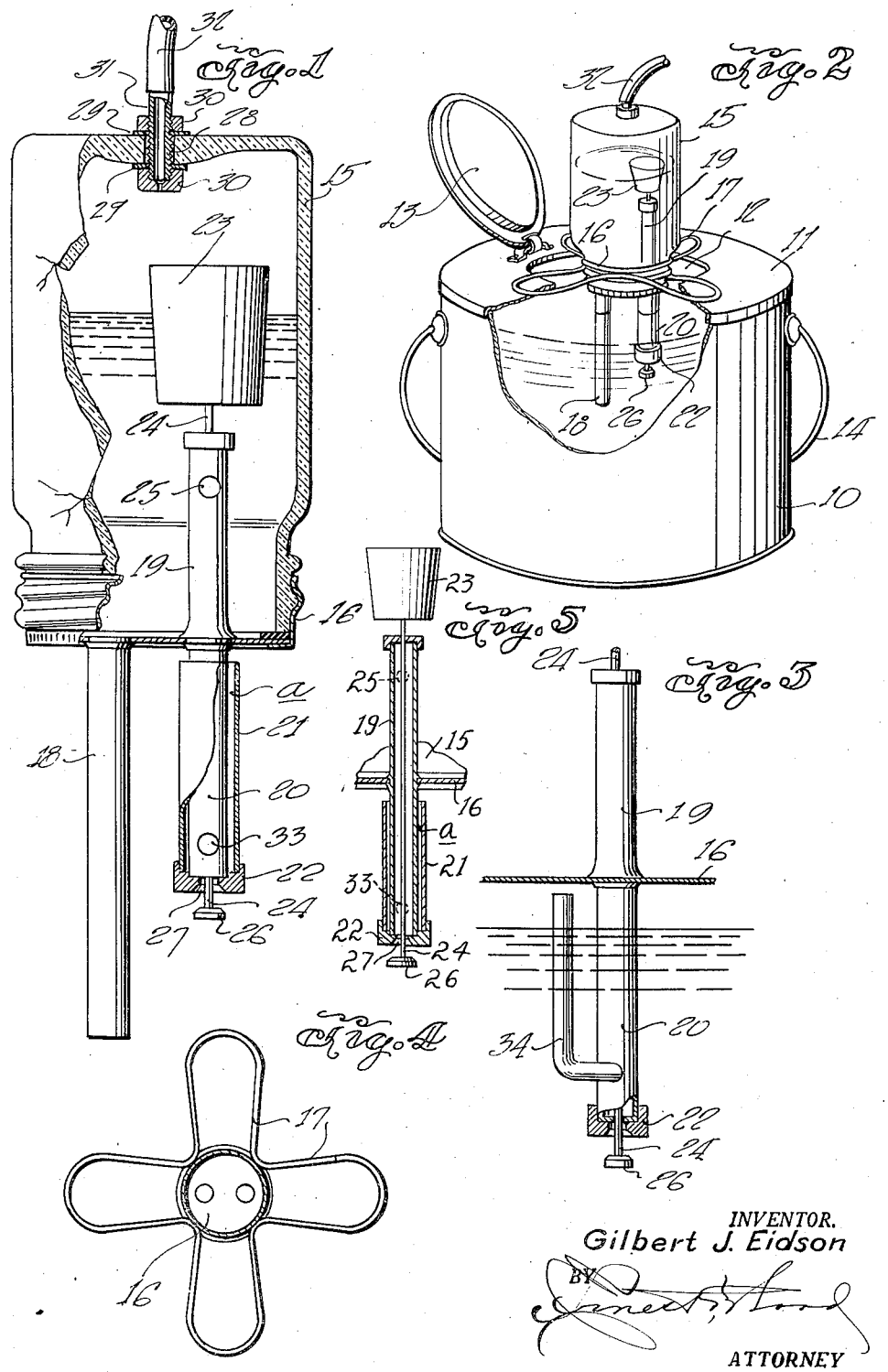
INVENTOR.
Gilbert J. Eidson
ATTORNEY Patented Jan. 10, 1950

2,493,952

UNITED STATES PATENT OFFICE 2,493,952

AERATING DEVICE FOR LIVE BAIT CONTAINERS

Gilbert J. Eidson, Irving, Tex.

Application March 10, 1947, Serial No. 733,461

5 Claims. (Cl. 43—57)

This invention relates to fishermen's supplies and equipment and it has particular reference to water aerating attachments for live bait containers.

The principal object of the invention is to provide as a part of a live bait container or as an attachment therefor, an aerating device whose intended function is to constantly agitate the water in which minnows or other live bait are transported from place to place, such agitation being accomplished with as little turbulence as possible in order that the fish will not be unduly excited or injured by violent contact with the walls of the container. To effect mild but effective agitation of the water, a partial vacuum is created in the device by virtue of suitable connection with the intake manifold of the engine of a vehicle in which the device is transported or by other equivalent means.

Another object of the invention is to provide an aerating device for the purpose set forth which consists of a receptacle adapted to be superimposed upon a live bait carrier, in which a partial vacuum is created, to fill which, water in the bait container is elevated through parallel tubes depending into the latter from the receptacle and, through the medium of a float in said receptacle, a valve in one of the tubes is closed to restore suction in the receptacle to cause the cycle to be repeated. In the course of operation, the water is thoroughly aerated thereby preserving the bait for long periods of time in a healthy condition.

With the foregoing and other objects in view the invention has reference to other features of accomplishment which will become apparent as the description proceeds when taken in connection with the accompanying drawings wherein:

Figure 1 is an elevational view of the aerating device per se with portions of the receptacle broken away to better illustrate internal parts.

Figure 2 is a perspective view of the invention installed in a conventional minnow bucket.

Figure 3 is a slightly modified form of suction releasing means for the aerator, Figure 4 is a plan view of the spider support for the aerator, and Figure 5 is a vertical sectional view of a valve tube forming a part of the invention.

Continuing with a more detailed description of the drawing, reference is primarily made to Figure 2 wherein numeral 10 denotes a conventional minnow bucket or live bait carrier whose top 11 has a central opening 12 which is closed by a hinged cover 13 during periods when the aerator, to be presently described, is not in use. A bail 14 is provided for carrying the bucket 10.

The aerating device of the invention consists of a receptable 15, preferably a conventional fruit jar, having a screw top 16. This receptacle, in operative position, is inverted and supported over the opening 12 of the bait container by means of a wire frame or spider 17, shown in Figure 4 in detail. The annular space about the neck of the jar may be closed by any suitable means such as a rubber mat, not shown, to keep the bait from leaping out of the bait container through the opening 12.

Affixed to the screw cap 16 of the receptacle 15 is a tube 18 which extends downwardly into the water of the container 10, as shown in Figure 2. Rising within the receptacle 15 is a tube 19, to the lower end of which is attached a tube 20 which depends alongside the tube 18 into the water of the container 10. Surrounding the tube 20 is a sleeve 21 whose diameter is such that an annular space $a$ is provided between the same and the tube 20, the purpose of which will be presently described. The lower end of sleeve 21 is closed by a cap 22 which latter also secures the sleeve to the tube 20. The upper end of sleeve 21 is open, as shown in Figure 1.

Above the tube 19 within receptacle 15 is a float 23 having a stem 24 extending into and guided by the tube 19, the latter being provided with an aperture 25, to which further reference will be made presently.

The stem 24 of the float extends axially through the aligned tubes 19 and 20 and past the bottom of the latter tube and carries a valve 26. The cap 22 which joins the lower ends of the tube 20 and its surrounding sleeve 21, has a valve seat 27 therein to accommodate the valve 26.

The bottom of the receptacle 15 which becomes the top of the aerator, is drilled to receive a sleeve 28, at each end of which are sealing washers 29 against which bear nuts 30, the latter being threaded onto a nipple 31 which is threaded into the sleeve 28, as shown in Figure 1. A flexible tube 32 is attached to the upper end of the nipple 31 and extends to the vacuum line of an automobile, such as the windshield wiper line which is connected to the intake manifold of the engine. Thus, adequate suction is set up in the jar or receptacle 15 during operating periods of the engine.

In operation, the partial vacuum created in the receptacle 15 causes water from the bait container 10 to raise through tube 18 as well as through tube 20 to the approximate water line in receptable 15, shown in Figure 1. When the receptacle is filled to the extent described, the float 23 rises, causing the valve 26 to seat, shutting off the water rising in tube 20. This action permits atmospheric air to enter the top of sleeve 21, flowing downwardly and entering 20 through port 33 and exhausting through port 25 into the water of the receptacle 15. In bubbling upwards through the water, the air aerates and purifies the water and keeps it in a constant state of mild agitation. Inasmuch as the diameter of the tube 32 is considerably less than the combined diameters of ports 25 and 33, the partial vacuum created in the receptacle 15 is immediately lost and the water line in the latter drops appreciably, say, one-half inch per cycle, flowing back into the bait container 10 through tube 18. As soon as the water level is lowered in the manner described, the float 23 recedes, causing valve 26 to open to again permit water from container 10 to rise in tube 20 upon reestablishment of suction sufficient for the purpose. Thus, the cycle of operation is repeated.

In Figure 3 is shown a slight modification of the invention. Instead of surrounding the tube 20 with a sleeve such as shown in Figure 1, to admit air to the tube 20, this is accomplished by means of a smaller tube 34 whose lower end is in communication with the lower end of tube 20 and having its upper end disposed above the high water line in the bait container 10. Obviously, the same result is accomplished, air entering the top of tube 34, when float 23 is in its highest position to admit air into tube 20 to break the partial vacuum in the receptacle 15 for the purposes described.

It is clearly apparent from the foregoing that there is a constant exchange of water back and forth between the receptacle 15 and container 10 sufficient to keep the water in constant circulation exposing it continuously to atmosphere. The fish are therefore preserved in a live and healthy condition for indefinite periods especially if the container 10 is replenished occasionally due to evaporation.

Manifestly, the construction as shown and described is capable of some modification and such modification as may be construed to fall within the scope and meaning of the appended claims is also considered to be within the spirit and intent of the invention.

What is claimed is:

1. An aerating device comprising a live bait carrier, a receptacle adapted to be supported on said carrier having parallel tubes depending into the water of said carrier, one of said tubes extending upwardly into said receptacle and provided with ports adjacent its upper and lower ends, a float above said latter tube having a stem extending axially through said tube and having a valve on its lower end seating against and closing the lower end of said tube, and means in the top of said receptacle for exhausting air therefrom creating a partial vacuum therein effective to displace water in said carrier upwardly into said receptacle to close said valve whereby to admit atmospheric air into said receptacle through the ports of said latter tube to reopen said valve and return the displaced water to said carrier.

2. An aerating device comprising a live bait carrier, a receptacle above said carrier having parallel tubes depending into the water of said carrier, means for creating a partial vacuum in said receptacle to elevate water from said carrier into said receptacle through said tubes, float actuated valve means in said receptacle controlled by water rising in said receptacle to close one of said tubes against further upward displacement of water, and means to admit atmospheric air through said latter tube into said receptacle to replace said partial vacuum and to reopen said valve means to return said water to said carrier.

3. An aerating device comprising a live bait carrier, a receptacle in which is created a partial vacuum, means responsive to said vacuum to effect upward displacement of water into said receptacle from said carrier, and float actuated valve means in control of said water displacement effective to admit air into said receptacle when the water therein reaches a predetermined level and operative to return the displaced water to said carrier upon replacement of vacuum in said receptacle.

4. In an aerating device, a live bait carrier, a receptacle above said carrier having tubes depending into the water of said carrier, one of said tubes having a valve at its lower end and extending into said receptacle, a float above the upper end of said tube having a stem extending axially therethrough and actuating said valve, means for creating a suction in said receptacle to effect displacement of water from said carrier upwardly into said receptacle to close said valve by said float and means to admit air into said receptacle through said valved tube to break said suction and to open said valve to return said displaced water to said carrier.

5. In an aerating device, a live bait carrier, a receptacle above said carrier in which is drawn a partial vacuum, means responsive to said vacuum to displace water from said carrier to said receptacle, and float actuated valve means operative upon predetermined displacement of water in said receptacle to close the latter against further displacement and to open the same to atmospheric pressure to return said water to said carrier and to reopen said valve means for further water displacement.

GILBERT J. EIDSON.

REFERENCES CITED

The following references are of record in the file of this patent:

UNITED STATES PATENTS

| Number | Name | Date |
|---|---|---|
| 1,945,962 | Arneth | Feb. 6, 1934 |
| 2,207,514 | Haldeman | July 9, 1940 |
| 2,341,246 | Stowe | Feb. 8, 1944 |